H. R. HARDING.
MACHINE FOR SKINNING AND CORING TOMATOES.
APPLICATION FILED MAY 10, 1921.
1,423,421.   Patented July 18, 1922.
7 SHEETS—SHEET 1.
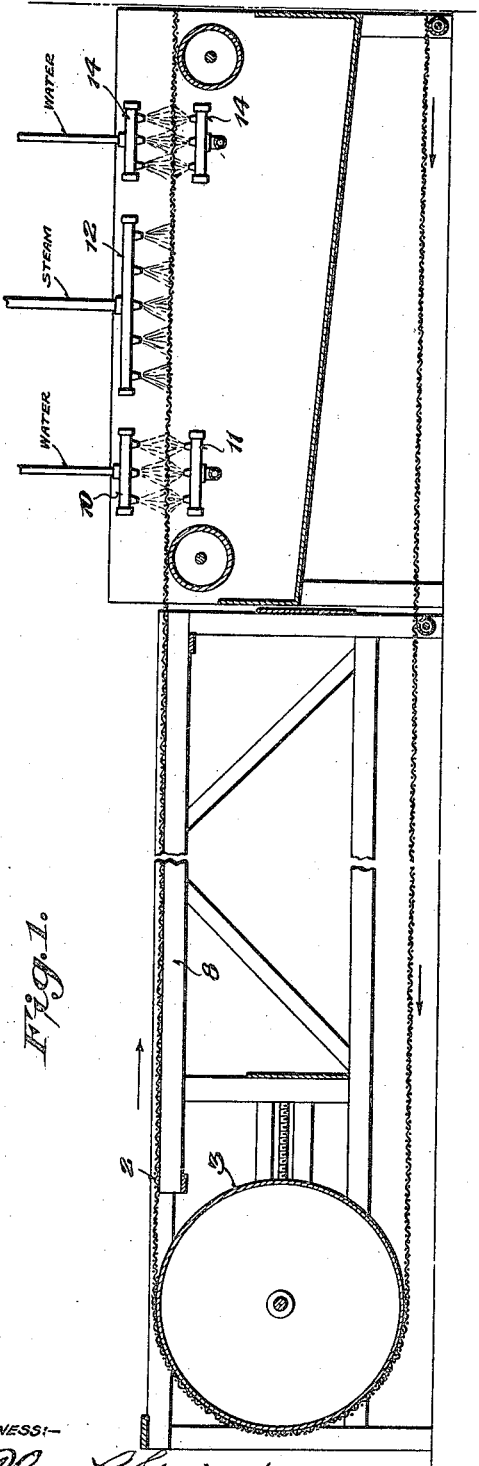
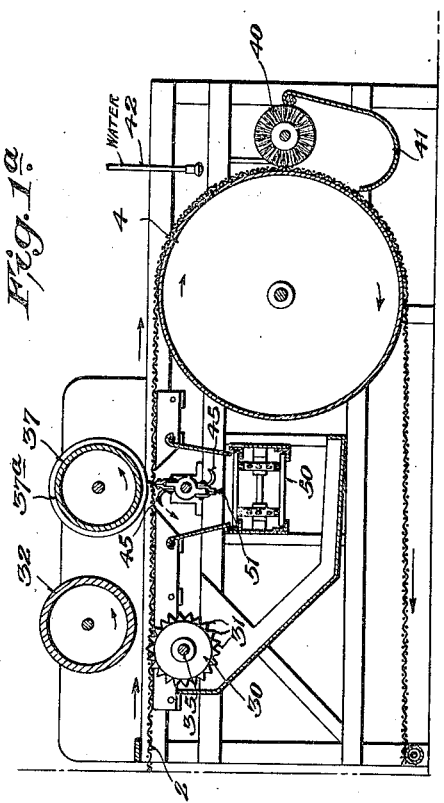
Inventor
Hiram R. Harding,
By Eugene C. Brown
Attorney
Witness:—
Chas. L. Griestaver

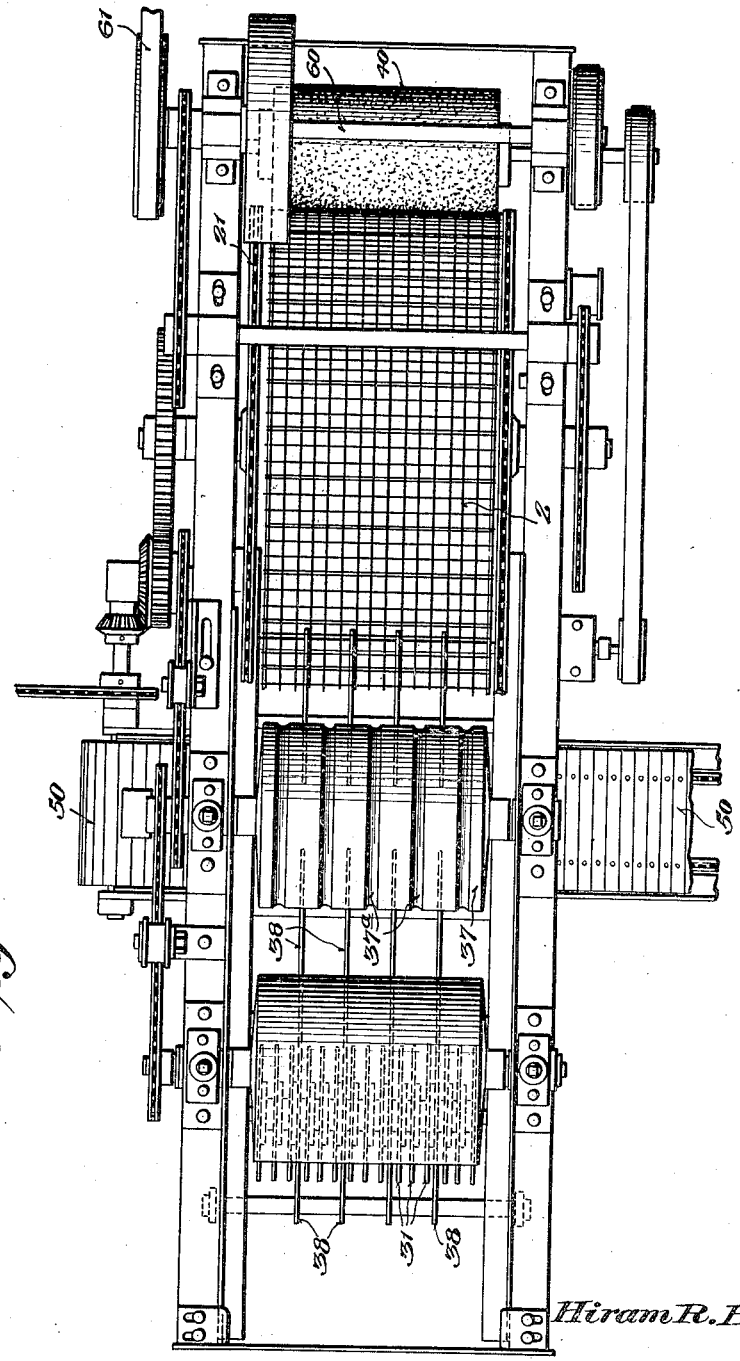

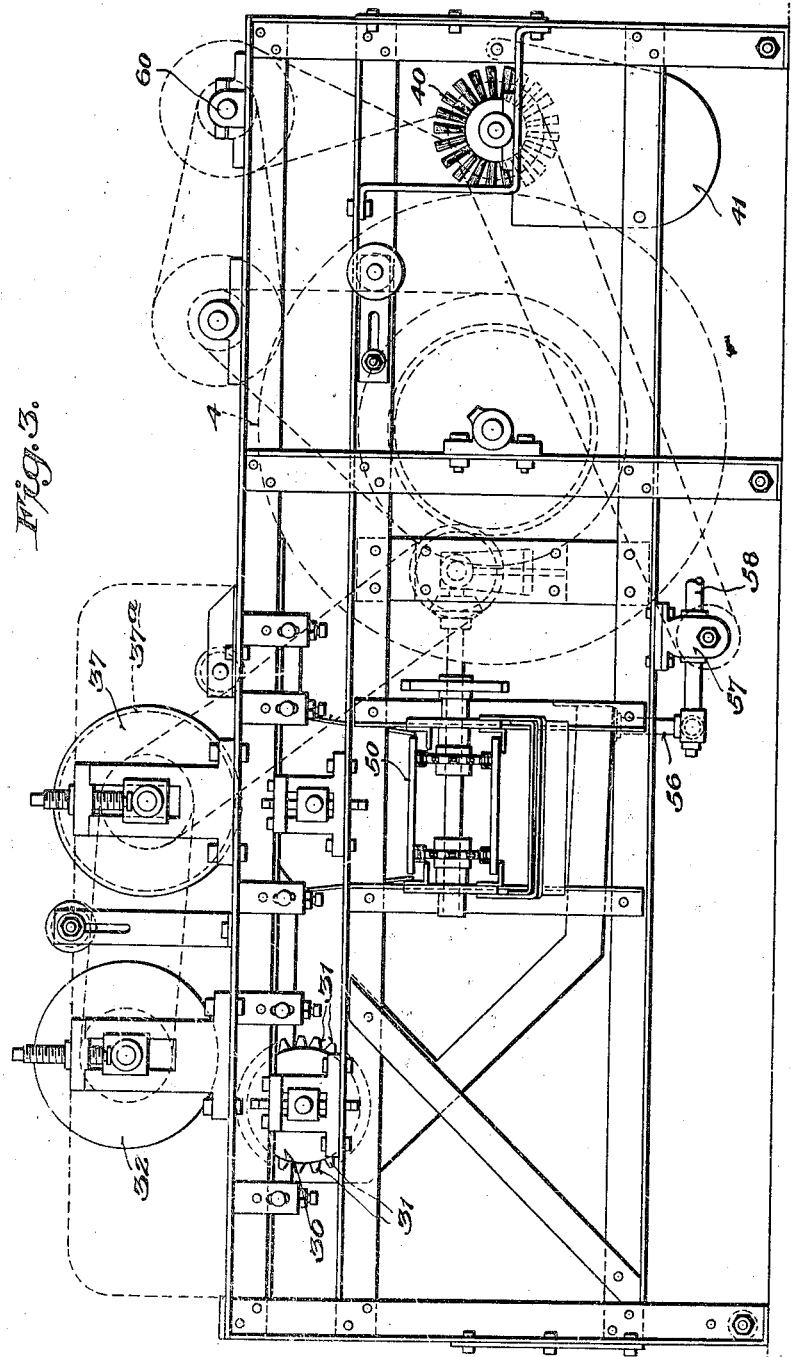

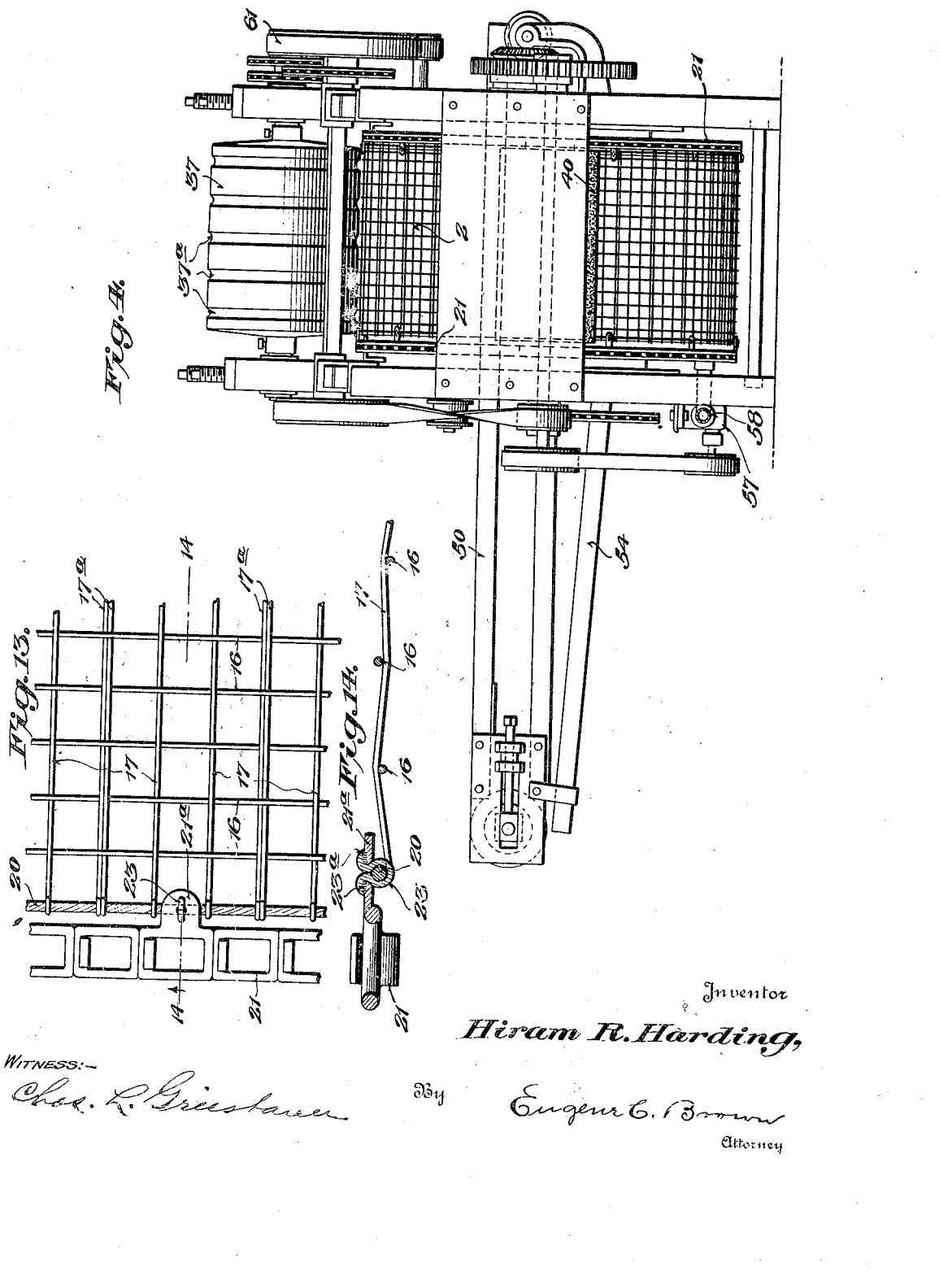

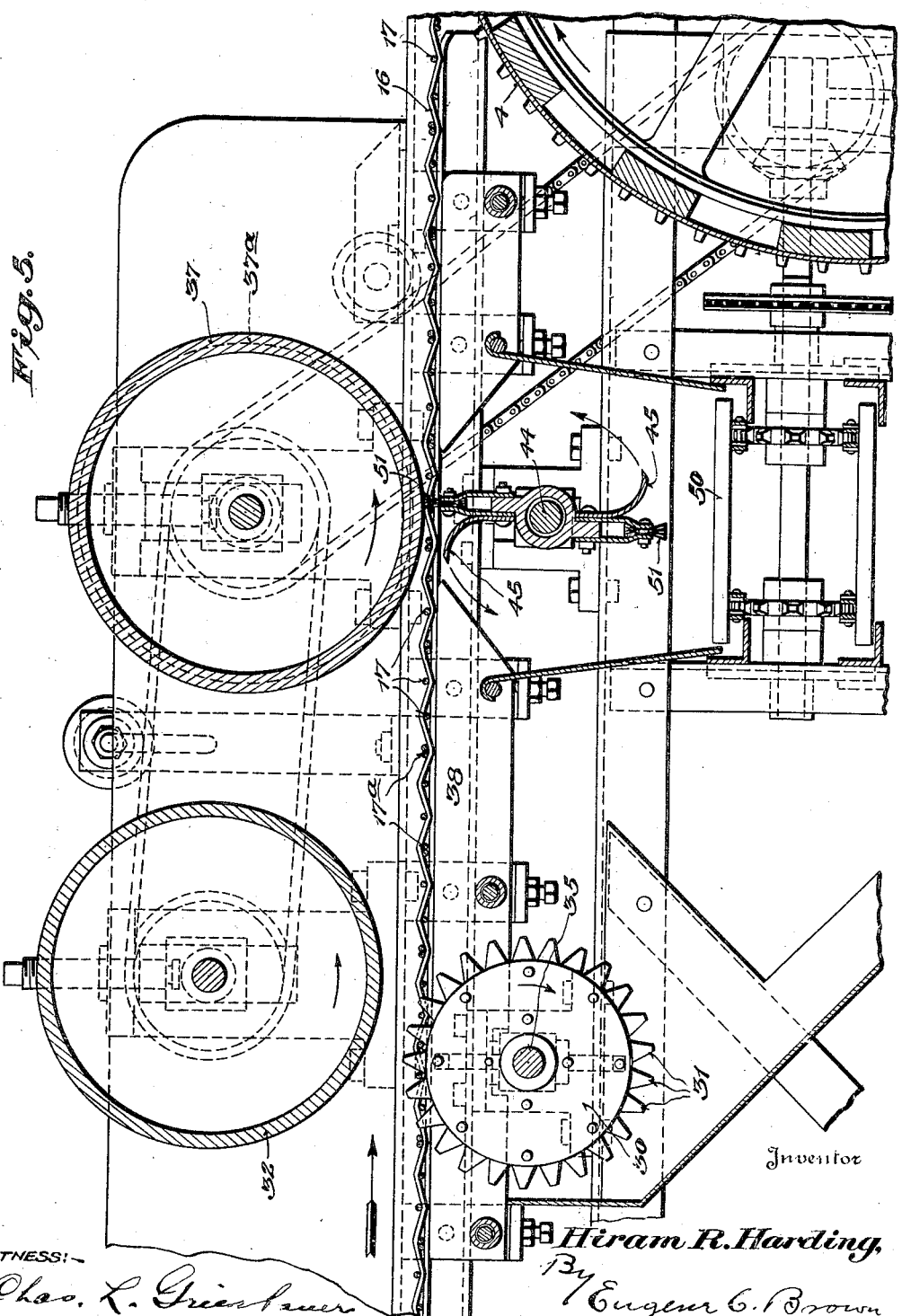

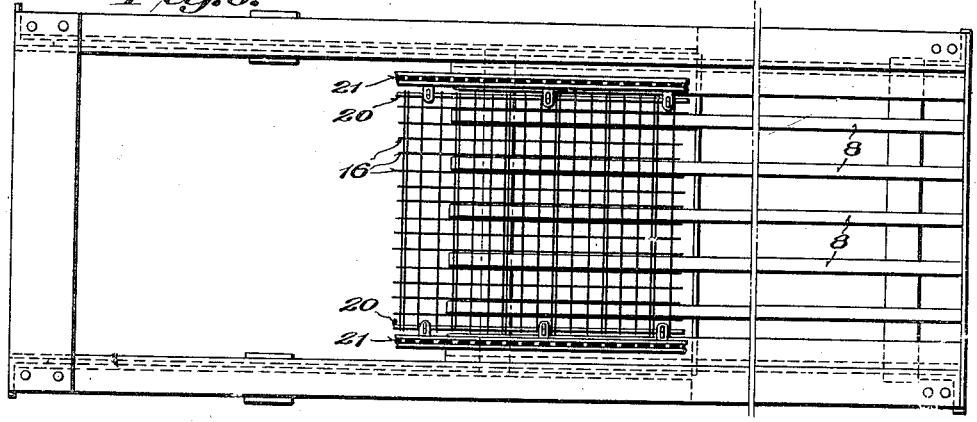
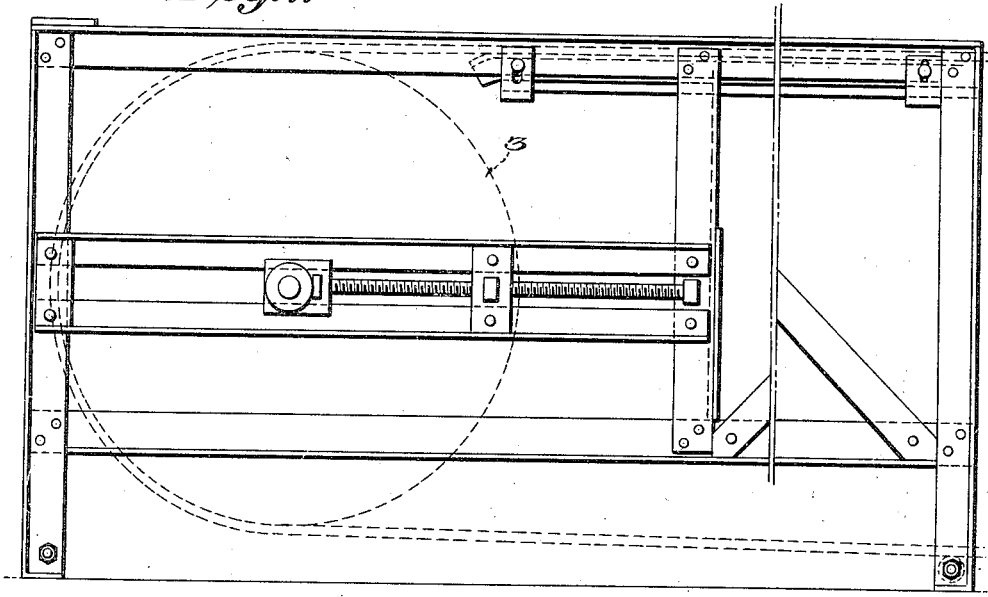
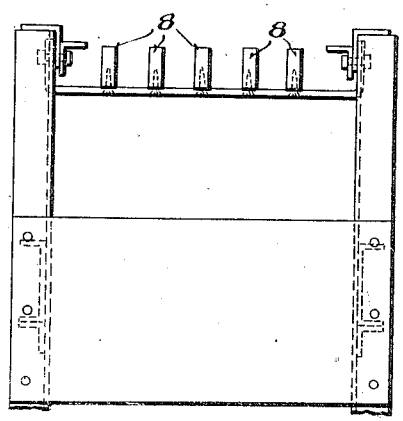

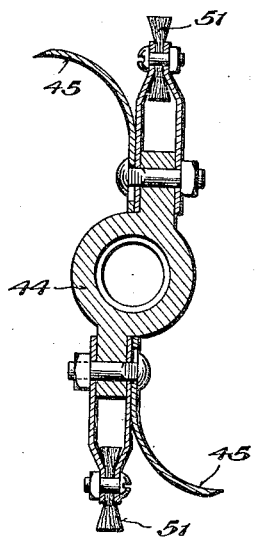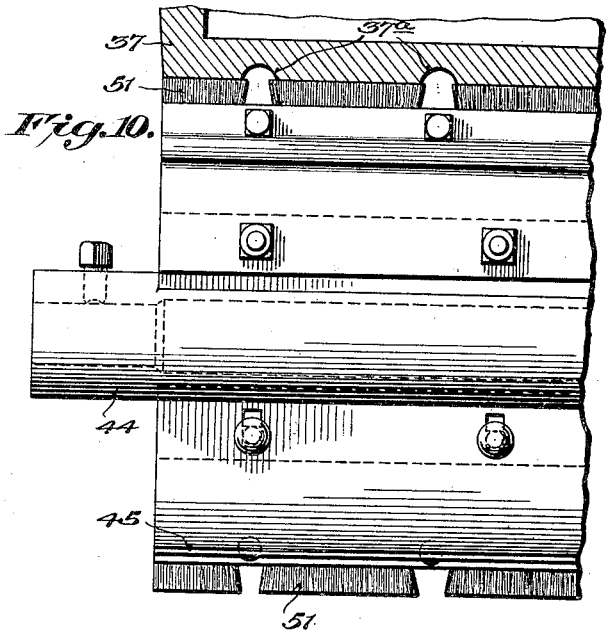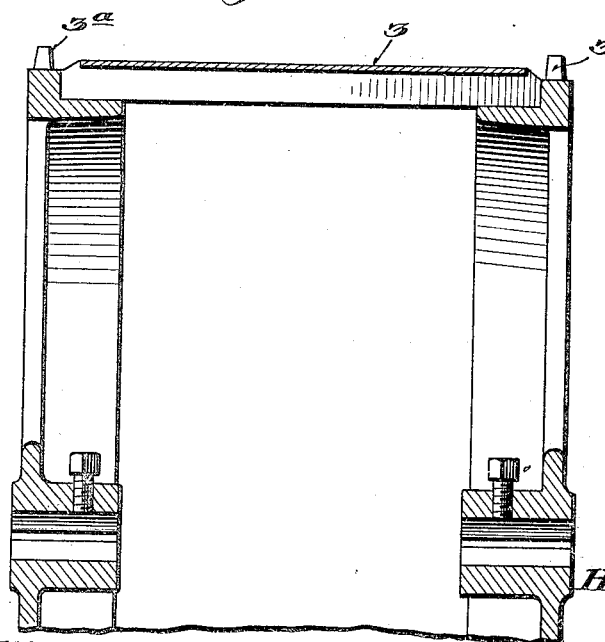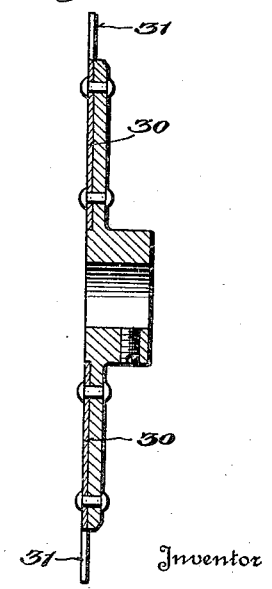

UNITED STATES PATENT OFFICE.

HIRAM R. HARDING, OF BALTIMORE, MARYLAND, ASSIGNOR TO THE HARDING PEELING MACHINE COMPANY, INC., OF BALTIMORE, MARYLAND, A CORPORATION OF MARYLAND.

MACHINE FOR SKINNING AND CORING TOMATOES.

1,423,421. Specification of Letters Patent. Patented July 18, 1922.

Application filed May 10, 1921. Serial No. 468,415.

*To all whom it may concern:*

Be it known that I, HIRAM R. HARDING, a citizen of the United States, residing in the city of Baltimore and State of Maryland, have invented certain new and useful Improvements in Machines for Skinning and Coring Tomatoes, of which the following is a specification.

The object of my invention is to provide a machine which will effectively remove the skin and core from tomatoes in a sanitary manner, with practically no waste and which is capable of a very large output in a given time. My present invention embodies certain new features and various improved details in the mechanism broadly covered by my prior Patent No. 1,356,447, granted October 19, 1920.

In the following description of the mechanism and method of operation, I shall refer to the accompanying drawings, in which—

Figures 1 and 1ª illustrate in side elevation, partly broken away and in more or less diagrammatic manner, a machine for skinning and coring tomatoes in accordance with my invention.

Figs. 2 and 3 are a top plan view and a side elevation, respectively of the rear end of the machine;

Fig. 4 is an end elevation viewed from the rear end;

Fig. 5 is a central longitudinal vertical sectional view of the skinning and coring mechanism;

Figs. 6, 7 and 8 are top plan, side elevation and end elevation views respectively of the supporting frame-work at the initial or feeding end of the machine;

Fig. 9 is an enlarged transverse sectional view of the rotary knife and brush;

Fig. 10 is a partial side elevation of the same;

Fig. 11 is a fragmentary transverse sectional view of the drum or driving pulley;

Fig. 12 is a transverse sectional view of one of the toothed sections of the slitting drum;

Fig. 13 is a fragmentary top plan view of the jointless woven wire belt conveyer; and Fig. 14 is a sectional view on the line 14—14 of Fig. 13;

The arrangement of parts and operation of the machine, as illustrated conventionally in Fig. 1, is the same as I have disclosed in my prior patent aforesaid. A continuous conveyer belt 2 extends from one end of the machine to the other and is supported by the drums 3 and 4, being driven by power applied to the latter. At the front or feeding end, the frame is provided with a plurality of equally spaced beams 8, over which the conveyer passes and which constitute guides for the positioning of the tomatoes, these guide beams extending the length of the feed table section.

As the tomatoes leave the feed table, they pass through the scalding and skin-loosening section, being first thoroughly washed in the sprays from the nozzles 10 and 11, then scalded under the steam jets issuing from the nozzle 12, and finally chilled in passing through the cold water spray from the nozzles 14 and 15, to loosen the skin from the meat or body of the tomato. Thence the tomatoes pass to the skinning, coring and slicing section shown in Fig. 1ª.

It is necessary to employ a wire conveyer belt. The woven wire mesh belts which are formed of jointed links are not suitable, not only on account of their inherent weakness and the great weight which would be required to obtain the necessary strength to sustain the load, but also because the skins are caught and held by the joints. I have, therefore, devised a conveyer belt in which the longitudinal strands 16 are continuous steel wires, the transverse wires 17 being interwoven and secured at their ends to wire cables 20 at either side. I find it is preferable to double every third transverse element, as indicated at 17ª. Sprocket chains 21 upon either side are provided at intervals with links having inwardly extending lips or lugs 21ª to which the cables 20 are secured by clips 23, which are preferably made integral by electric welding, as indicated at 23ª. In so far as I am aware conveyers have not been formed of continuous wire strands, probably because the constant bending to which they are subjected as they pass around the pulley drums, which produces a crystallization resulting in a rapid deterioration and breakage. I have discovered that crystallization may be avoided and the integrity of the wire may be preserved by employing drums or pulleys having a diameter which provides a peripheral curvature less than that required to bend the wire beyond its elastic limit, or in other words, less than the amount of curvature or bend which will produce a permanent set in the wire. It will be obvious that if the wire passing around the drum only bent slightly its inherent power to spring back or straighten out is not impaired and under these conditions the molecular condition of the metal of the wire is not altered. Accordingly by making the drums of the proper diameter I am enabled to construct the belts with longitudinal strands of continuous steel wire without joints and to thus obtain a conveyer exceedingly light in weight while possessing great tensile strength.

The bases of the sprocket teeth 3$^a$ are preferably slightly within the periphery of the drum, as indicated in Fig. 11, so that the median line through the links of the sprocket chains is coincident with the plane of the wire mesh. In this manner the tensile strains are distributed through the belt and the chains cooperate with the longitudinal strands and cables in taking the stresses.

It has been previously stated that when the tomatoes leave the scalding and chilling section, the skins have been loosened from the meat or pulp. As the tomatoes pass over the slitting drum 30 they are held in position by the holding-drum 32, and the slitting teeth 31, which project through the meshes of the conveyer belt, slit the lower side of each tomato. In practice I have spaced the disks carrying the teeth 31 so that each tomato will be cut by three rows of teeth, but it is evident that the number may be changed. The slitting drum is loose upon the shaft 35 and is rotated by the engagement of the teeth with the cross wires of the belt. When the slitted tomatoes pass under the drum 37, the pulp or meat is forced through the meshes of the belt while the cores enter the grooves 37$^a$ and remain above the belt together with the skin and are conveyed to the end where they are swept by the rotating brush 40 into the pan or trough 41, the wires of the belt being thoroughly cleansed by the brush assisted by a spray of water from the pipe 42. While the pulp is being forced through the meshes by the squeezing or pressing roll 37, it is quickly sliced by the rapidly revolving knife blades 45, carried by the hub 44 and which are curved in the direction of motion so that they carry the several pieces of tomato downwardly upon the transversely operating delivery conveyer 50. Any portions of the pulp which have not been forced entirely through the meshes are wiped by the wire brushes 51, which are mounted directly behind the knives but extend slightly beyond the path of the knives so that they may pass through the meshes. In order that the cores may be undisturbed, the brushes are divided into sections separated by spaces which coincide with the grooves 37$^a$ in the pressing roll, as indicated in Fig. 10.

The pulp or meat of the tomatoes is transferred to a suitable receptacle by the transversely operating slatted conveyer 50, while the juice is caught in a trough 54 and is delivered by the pipe 56 to the pump 57 which forces it through pipe 58 to a suitable receptacle.

The drive shaft 60, is connected to any suitable source of power, indicated by the belt 61, and is connected by suitable chains, belts and gearing with the several shafts carrying the moving parts in the manner clearly indicated in the drawings.

The operation of the machine will be understood from the above detailed description of structural parts. The tomatoes are placed on the belt stems upward over the guide beams 8, by the operators who stand upon either side of the feeding table. After traversing the scalding and chilling section which looses the skin, the tomatoes pass between the vertical spacing guides 38, and after being slitted by the teeth 31 of the slitting drum 30, the pulp is forced through the meshes of the belt by the pressing roller 37, the cores remaining on the upper side of the belt with the skins because of the grooves 37$^a$ which receive the cores. The pulp is sliced or cut into small pieces by the rotating curved blades 45, any portions clinging to the meshes being swept downwardly by the rotating brushes 51.

It will be observed that the wire-brushes 51 are divided longitudinally into sections with spaces between, which cooperate with the grooves in the pressing roller to permit the cores to remain upon the belt. The sliced pulp is carried by the conveyer 50 to a suitable receptacle and the juice is collected in the trough 54 and forced by the pump 57 through the pipe 58 to a suitable vessel to be transported with the pulp to the canning department. The skins and cores pass over the end drum 4 and are swept from the meshes of the conveyer belt by the rotating brush 40, into the refuse trough 41, the water from the spray pipe 42 assisting to thoroughly cleanse the wire strands of the conveyor.

I have described in detail the particular structure illustrated in the accompanying drawings, which illustrate my preferred construction but it is evident that various changes and modifications can be made without departing from my invention.

I claim:—

1. In a machine for skinning and coring tomatoes in a continuous operation, the combination with a wire-mesh belt conveyor and scalding means through which the conveyor carries the tomatoes, of a pressing roller above the conveyor to hold the tomatoes firmly upon the meshes of the belt, a slitting drum beneath the belt having toothed cutters which project through the meshes to slit the tomatoes, and a pulp separating mechanism comprising a roll provided with separated grooves to receive the cores while pressing the meats or pulp through the wire meshes, and a combined revoluble cutter and brush below the belt having complementary cutter blade and brush portions, the blade operating in advance of the brush to cut the pulp protruding through the belt and the brush engaging the wire-strands of the belt and projecting into the meshes to remove any remaining portions of pulp.

2. A machine as set forth in claim 1, having the brushes divided longitudinally into setions which are separated substantially the width of the grooves in said roll and in alinement therewith.

3. In a machine for skinning and coring tomatoes in a continuous operation, the combination with a wire-mesh conveyor belt comprising continuous longitudinal steel-wire strands and intermeshed crossed-wires, of means for washing and scalding tomatoes, means for slitting the tomatoes, and means cooperating with the conveyor belt for separating the pulp from the skins and cores.

4. In a machine as set forth in claim 3, a depositing table having a series of longitudinally extending beams or ribs, which are in alinement with the slitting devices and serve as guides for the operators in positioning the tomatoes upon the belt.

5. In a machine for skinning and coring tomatoes in a continuous operation, the combination with a wire-mesh belt conveyor and scalding means through which the conveyor carries the tomatoes, of a pressing roller above the conveyor operating to hold the tomatoes firmly upon the meshes of the belt, and a slitting drum beneath the belt having toothed cutters which project through the meshes to slit the tomatoes.

In testimony whereof I affix my signature.

HIRAM R. HARDING.